United States Patent [19]
Rock

[11] 3,951,221
[45] Apr. 20, 1976

[54] COMPUTING POSTAL SCALE
[75] Inventor: Frank C. Rock, Santa Rosa, Calif.
[73] Assignee: National Controls, Inc., Santa Rosa, Calif.
[22] Filed: Sept. 30, 1974
[21] Appl. No.: 510,467

[52] U.S. Cl. .................................. 177/1; 177/25; 177/DIG 3
[51] Int. Cl.² ................................ G01G 23/22
[58] Field of Search ............... 177/25, 26, DIG. 3, 177/211, 1; 235/58 PS, 61 PS

[56] References Cited
UNITED STATES PATENTS

| | | | |
|---|---|---|---|
| 2,689,082 | 9/1954 | Kolisch | 177/25 X |
| 3,039,686 | 6/1962 | Bell et al. | 177/DIG 3 |
| 3,315,067 | 4/1967 | Bell et al. | 177/25 X |
| 3,635,297 | 1/1972 | Salaya | 177/25 X |
| 3,851,151 | 11/1974 | Stambera | 235/61 PS X |
| 3,869,005 | 3/1975 | Williams, Jr. et al. | 177/25 |
| 3,869,007 | 3/1975 | Haggstrom et al. | 177/211 |

Primary Examiner—George H. Miller, Jr.
Attorney, Agent, or Firm—Flehr, Hohbach, Test, Albritton & Herbert

[57] ABSTRACT

Highly accurate and versatile computing scale which is particularly suitable for postal use. The platform of the scale is mounted on and supported by a single load cell in a system requiring no levers, pivots or other moving parts. Weight readings are averaged on a moving average basis, and in one preferred embodiment the scale has an accuracy on the order of 1/32 ounce over a range of 70 pounds. With no load on the scale, any drift is cancelled by increasing or decreasing the net weight reading in small increments during successive counting cycles to maintain an accurate zero reference. The scale includes a keyboard through which a postal clerk can enter information about the destination and type of service desired, and a zip code to postal zone converter is included for automatically determining the postal zone from the zip code. Digital displays indicate the weight and postage to both the clerk and customer. The scale can readily be interfaced with other machines such as postage meters and label/ticket printers so that output data from the scale is available to the other machines.

10 Claims, 10 Drawing Figures

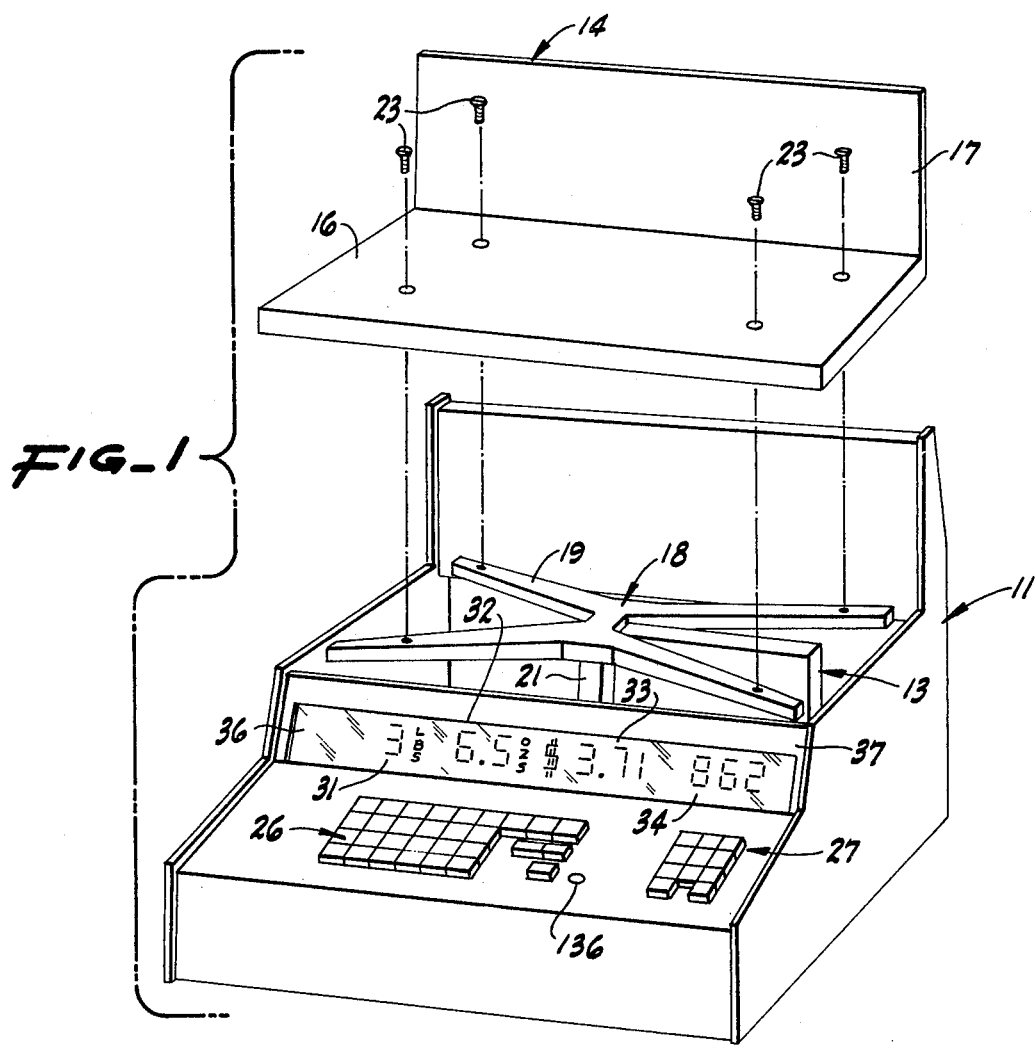
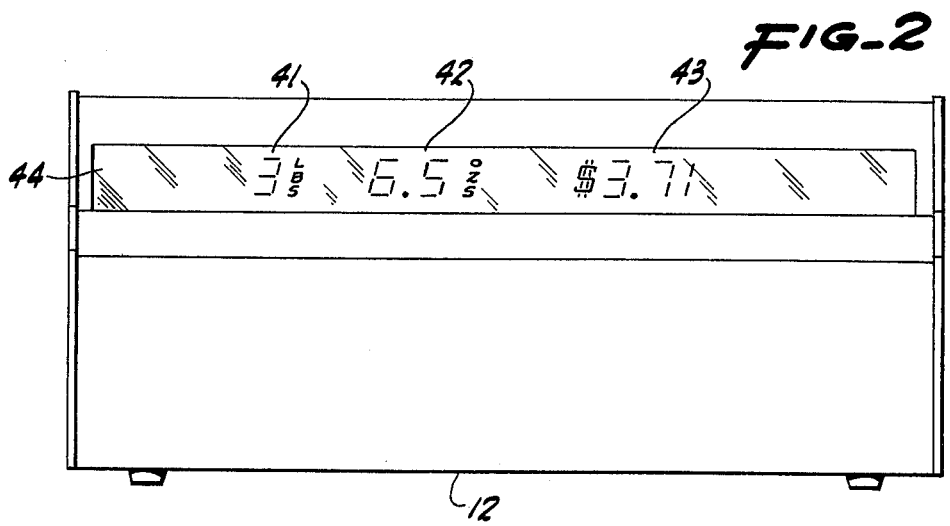

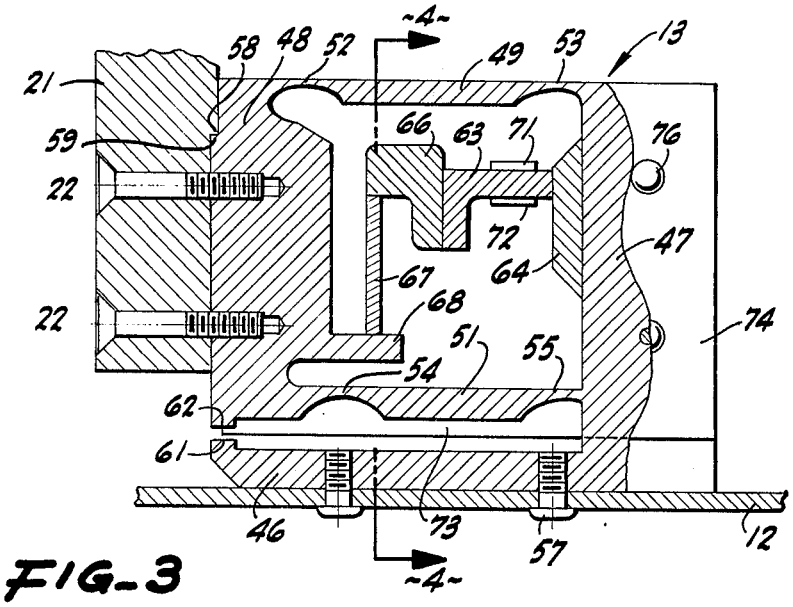
FIG_6
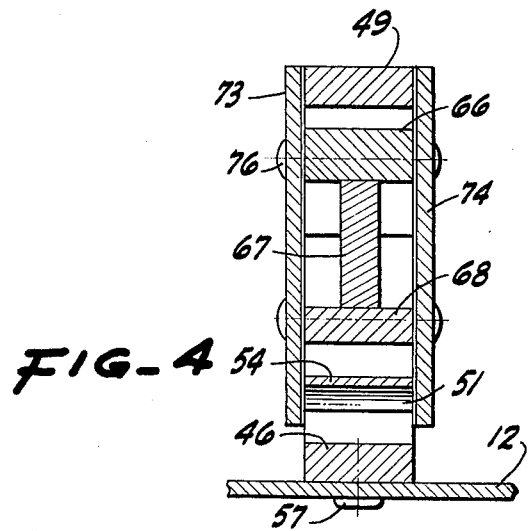
FIG_3
FIG_4

COMPUTING POSTAL SCALE

BACKGROUND OF THE INVENTION

This invention pertains generally to computing scales and more particularly to a computing scale which is particularly suitable for postal use.

A number of factors are involved in determining the cost of sending a letter or package from one place to another, including the size and weight of the object, the distance it is to be sent, and the manner in which it is sent. In the past, clerks have had to weigh letters and packages manually, then determine the correct postage from tables or by calculation, then add the charges for any special services desired (e.g., special delivery), and affix the stamps or other indicia that the postage has been paid to the letter or package. This is a time-consuming process and one which is subject to a number of errors on the part of the clerk required to perform the various mechanical operations.

With the advent of computers and calculators, it appeared that at least some of the calculations previously performed manually by postal clerks might be done faster and more accurately on machines. However, a clerk provided with a calculator must still weigh a package or letter manually and obtain information such as postal zone rates from tables, then enter the weight and rate information manually into the calculator.

There have been some attempts to provide computing scales which will weigh a package or letter and then combine the weight information with rate information stored therein to determine the postage. However, postal scales require an accuracy of less than one ounce over a range on the order of 70 pounds, and electronic scales heretofore provided have not been capable of such accuracy.

SUMMARY AND OBJECTS OF THE INVENTION

The invention provides a highly accurate and versatile computing scale which is particularly suitable for postal use. The platform of the scale is mounted on and supported by a single load cell in a system requiring no levers, pivots or other moving parts. Weight readings are averaged on a moving average basis, and in one preferred embodiment the scale has an accuracy on the order of 1/32 ounce over a range of 70 pounds. With no load on the scale, any drift is cancelled by increasing or decreasing the net weight reading in small increments during successive counting cycles to maintain an accurate zero reference. The scale includes a keyboard through which a postal clerk can enter information about the destination and type of service desired, and a zip code to postal zone converter is included for automatically determining the postal zone from the zip code. Digital displays indicate the weight and postage to both the clerk and customer. The scale can readily be interfaced with other machines such as postage meters and label/ticket printers so that output data from the scale is available to the other machines.

It is in general an object of the invention to provide a new and improved computing scale.

Another object is to provide a computing scale of the above character which is particularly suitable for postal use.

Another object is to provide a scale of the above character having a weigh platform mounted on and supported by a single load cell.

Another object is to provide a scale of the above character in which weight readings are averaged on a moving average basis to provide a more accurate reading than would be possible with individual weight readings.

Another object is to provide a scale of the above character in which the zero reference level is accurately maintained.

Additional objects and features of the invention will be apparent from the following description in which the preferred embodiment is set forth in detail in conjunction with the accompanying drawings.

BRIEF DESCRIPTION OF THE DRAWINGS

FIG. 1 is a perspective view, partially exploded, of one embodiment of a computing postal scale according to the invention.

FIG. 2 is a rear elevational view of the scale of FIG. 1.

FIG. 3 is a fragmentary sectional view, partly broken away, of a portion of the scale of FIG. 1, illustrating the load cell and the manner in which the platform is mounted thereon.

FIG. 4 is a cross-sectional view taken along line 4—4 in FIG. 3.

FIG. 6 illustrates the manner in which weight data is arranged in a weight register in the scale of FIG. 1.

DESCRIPTION OF THE PREFERRED EMBODIMENT

Figure 5:
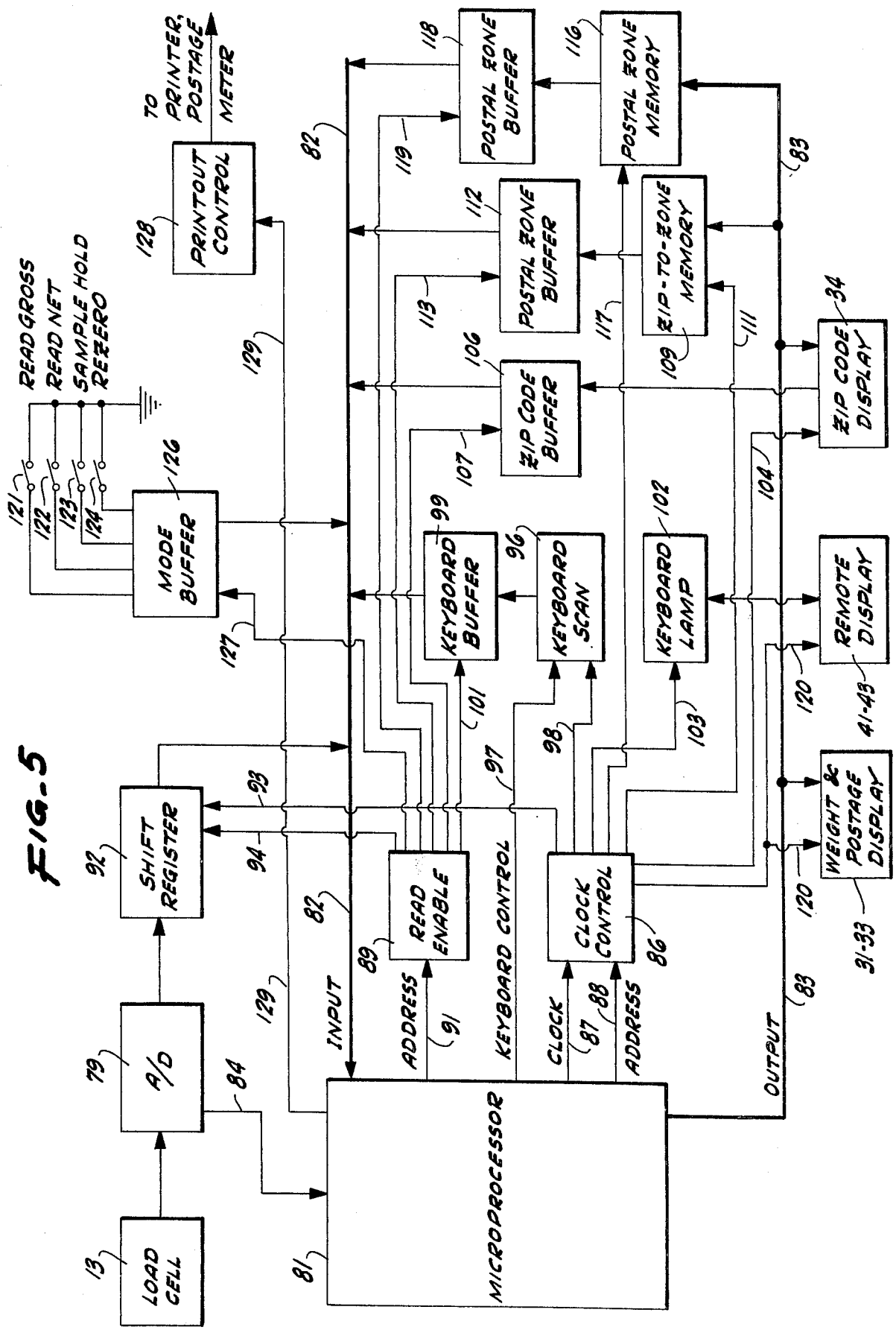
FIG. 5 is a block diagram of the computing portion of the scale of FIG. 1.

As illustrated in FIGS. 1–4, the scale includes a console or cabinet 11 having a bottom wall or base 12 on which a load cell 13 is mounted. A platform 14 for receiving objects to be weighed is mounted on and supported by the load cell. As illustrated, the platform is a generally L-shaped structure having a horizontally extending portion 16 and an upstanding portion 17, the upstanding portion being disposed toward the rear of the scale. The platform rests upon a load spider 18 having a plurality of diagonally extending arms 19 and a depending stem 21 which is secured to the load cell by screws 22. The platform is affixed to the spider arms by screws 23. Suitable stops, not shown, are provided for limiting downward and rearward movement of the platform to protect the load cell against damage from overloads such as a heavy package being dropped or thrown onto the platform.

A keyboard 26 is provided toward the front of the console for receiving input data pertaining to the manner in which an object being weighed is to be shipped. In the embodiment illustrated, the keys are arranged generally in four rows, with the keys in the upper row representing the nine postal zones in the United States. The second row contains keys for selecting the class of service desired, e.g., priority, parcel post, first class, air mail, third class, or book rate. The third row contains keys for the services of another postal agency, such as United Parcel Service, and the fourth row contains keys for special services such as registered mail, certified mail, insurance, return receipts, special delivery, and C.O.D. A separate key is provided for large, light-weight packages which must be shipped at a special rate, and a PRINT key is provided for initiating the operation of any auxiliary equipment connected to the scale. A RESET key is provided for clearing the keyboard of previous entries and clearing the machine of calculations based on these entries.

The keys are fabricated of a translucent material, and they are labeled with the functions which they represent. Lamps are provided beneath the keys, and they are illuminated to indicate the functions which have been selected. For example, if a letter is to be sent airmail, registered, with a return receipt, the air mail, registered mail and return receipt keys would be depressed, and the lamps associated with these keys would be illuminated.

A ten-key keyboard 27 is provided to the right of keyboard 26. Keyboard 27 provides means for inputting zip code data to a converter which determines postal zones from zip codes.

Digital displays 31–34 are provided for indicating the weight in pounds and ounces of an object on the scale, the cost of sending the object, and the first three digits of any zip code input through keyboard 27. In the preferred embodiment, the displays are provided by seven-segment display elements mounted behind a translucent window 36 in a sloping panel 37 above the keyboards.

A remote display 39 is provided at the rear of the scale and comprises display elements 41–43 mounted behind a translucent window 44. These elements display the same weight and postage information as displays 31–33, but they are positioned to be viewed by a customer, whereas displays 31–33 are best seen by a clerk or other person operating the scale.

As illustrated in FIGS. 3–4, load cell 13 includes a generally rectangular framework comprising a base 46, a side frame 47, a load arm 48, an upper arm 49, and a lower arm 51. Arms 49 and 51 are substantially equal in length, and they are generally parallel to each other and to base 46. The frame is a unitary structure, and it is formed to include flexures 52–55 between arms 49, 51, side frame 47 and load arm 48.

Base 46 is affixed to the bottom wall or base 12 of cabinet 11 by screws 57, and the stem 21 of load spider 18 is mounted on load arm 48 of the load cell. Load arm 48 is provided with an upwardly facing shoulder 58 which is engaged by a downwardly facing shoulder 59 on the load spider stem. A load applied to platform 14 is thus transmitted to load arm 48 and produces a downward deflection of this arm corresponding to the weight of the load. Stops 61, 62 formed on base 46 and load arm 48 limit the travel of the arm to provide overload protection.

A beam 63 is rigidly affixed at one end to a block 64 which is secured to side frame 47. The other end of the beam is affixed to a block 66, and a tie rod 67 extends between this block and a protrusion 68 formed on load arm 48. As best seen in FIG. 4, the tie rod is narrower than arms 49, 51 and flexures 52–55, and it extends in a direction generally parallel to the direction in which load arm 48 is deflected by a load on the platform.

When load arm 48 is deflected by a load, the force exerted by the load is transmitted to beam 63 by tie rod 67, causing the beam to bend by an amount corresponding to the weight of the load. The amount of bending is detected by strain gauges 71, 72 which are mounted on beam 63 and have electrical resistances which depend upon the forces applied to the beam. An electrical current is applied to the strain gauges by conventional wiring, not shown, to provide an output voltage corresponding to the weight of the load.

Cover plates 73, 74 extend over the sides of the load cell to enclose the same. These plates are secured to side frame 47 by suitable means such as rivets 76. Even though the platform area is substantially larger than the load cell, the reading of the load cell is generally not affected by the placement of the load on the platform or side-loading effects.

Referring now to FIG. 5, the output of load cell 13 is connected to the input of an analog-to-digital converter 79 which converts the output voltage from the load cell to digital signals corresponding to the weight of the load at a suitable clock rate such as 15 times per second. In the preferred embodiment, the A/D converter is similar to a conventional dual slope digital voltmeter modified to provide output signals in straight binary form, rather than the more usual binary coded decimal form. The binary form is particularly suitable for use in a scale in which readings are made in units of pounds and ounces because of the binary-like relationship between the units.

Means is provided for storing postal rate information in digital form and combining this information with the weight signals from converter 79 and additional input data from keyboards 26 and 27 to determine the cost of mailing an object. This means includes a microprocessor, designated generally by reference numeral 81, having a data input line 82 and a data output line 83. One suitable microprocessor is a four-bit parallel system available from Intel Corporation, Santa Clara, California, under the trademark MCS-4, and includes a model 4004 central processor unit (CPU), model 1702 programmable read-only memories (PROM's), model 4002 random access memories (RAM's).

The microprocessor receives a signal on line 84 from converter 79 each time a conversion is made, and it delivers clock pulses and clock address pulses to a clock control 86 on lines 87 and 88. Read address signals are applied to a read enable controller 89 on an address line 91.

The binary output signals from A/D converter 79 are read into a shift register 92 upon receipt of a clock pulse on line 93. The signals in the shift register are read into the microprocessor through input line 82 upon receipt of an enable signal on line 94.

Keyboards 26 and 27 are scanned by a keyboard scanner 96 which receives control signals on line 97 from the microprocessor and clock signals on line 98 from the clock control. Upon receipt of clock signals, the scanner transfers the data from the keyboards to a buffer register 99 from which it is read into the microprocessor through input line 82 upon receipt of a read signal on line 101. The keyboard lamps, designated generally by reference numeral 102, are illuminated in accordance with output data on line 83 upon receipt of clock pulses on line 103.

Zip code display 34 receives data from output line 83. Upon receipt of clock pulses on line 104, this data is displayed and transferred to a buffer register 106. Upon receipt of a read signal on line 107, the data is read into the microprocessor through input line 82.

As mentioned previously, the scale includes a converter for determining postal zones from zip code information. The data for this conversion is stored in a suitable memory 109 which, in the preferred embodiment, comprises a programmable read-only memory. If desired, other forms of storage can be utilized, but the PROM has the advantage of being reprogrammable in the event that the scale is moved from one zip code area to another. The memory receives address information from output line 83, and upon receipt of a clock pulse on line 111, the postal zone data is transferred to a buffer register 112. This data is read into the microprocessor through input line 82 upon receipt of a read signal on enable line 113.

Postal rate data is stored in a suitable memory 116 such as a PROM or a more permanent device such as an integrated circuit made specifically for the purpose. This memory also receives address information from output line 83, and upon receipt of a clock pulse on line 117, the selected rate data is transferred to a buffer register 118. This data is read into the microprocessor through input line 82 upon receipt of a read signal on line 119.

Displays 31–33 and 41–43 receive weight and postage data from output line 83 and display this data upon receipt of clock signals on line 120.

Switches 121–124 are provided for selecting the mode of operation of the scale. Closure of switch 121 conditions the scale to read gross weight, closure of switch 122 conditions the scale to read net weight, closure of switch 123 conditions the scale to hold the reading of the scale so that the data displayed is changed when the scale is not in motion, and closure of switch 124 resets the scale to zero. Data indicating the conditions of the switches is present in a buffer register 126, and this data is read into the microprocessor through input line 82 upon receipt of a read signal on line 127.

The microprocessor is connected to a printout control 128 by a line 129, and the microprocessor can control the operation of a printer, postage meter or other device to which the printout control is connected.

As illustrated in FIG. 6, weight data is registered in a weight register 131 which, in the preferred embodiment, comprises a random access memory. In order to enhance the accuracy of the scale, weight determinations are based on averaged readings, rather than individual readings. For this purpose, the eight most recent readings from converter 79 are read into memory cells in register 131 on a rotating basis, whereby each new reading replaces the oldest reading in the register. The register is divided into four sections, designated 0–3, and the memory cells for the incoming weight readings, designated WT1-WT8, are located in sections 0 and 1. Each of the cells contains sixteen bits arranged in four 4-bit bytes. As illustrated for WT1, the least significant four bits in each cell range in significance from 1/64 ounce to ⅛ ounce, the next most significant four bits range from ¼ ounce to 2 ounces, the next most significant four bits range from 4 ounces to 2 pounds, and the most significant four bits range from 4 pounds to 32 pounds.

Since the most significant bit in the memory cells for weight WT1-WT8 represents 32 pounds, the maximum weight which can be registered in each of these cells is slightly less than 64 pounds. In order to increase the range to the 70 pounds required for postal use without increasing the size of the cells, both positive and negative readings are utilized, and a negative reading such as −32 pounds is defined as the zero reference level. With negative readings, the complement of the reading is registered rather than the reading itself.

The polarities of weight readings WT1-WT8 are entered into a polarity register in section 2 of register 131. In this register, positive polarities are indicated by the number 0000, and negative polarities are designated by the number 0001.

The weight readings in register 131 are averaged each time a new reading is taken to provide a moving average of the weight readings. This average is registered in a totalizing register in section 3 of register 131. The polarity of the average is registered in shift register 92 in a form similar to the manner in which the polarities of the weight ratings are registered in the polarity register.

In the preferred embodiment, the averaging is done by adding the least significant four bits of the first two weight readings together and registering the sum in byte A of the totalizing register. The process is continued for four bit groups of increasing significance until the number stored in the totalizing register is the sum of the first two weight readings. The polarities of the two readings are then checked, and if they are the same, this polarity is assigned to the sum registered. If the polarities are different the polarity of the sum is determined by the presence or absence of a carry from the addition. If there is a carry, the sum is positive, and if there is no carry, the sum is negative. The correct polarity is assigned to the sum. This process is continued until all eight weight readings have been added together and the number in the totalizing register represents the total of the eight readings and the polarity registered in the storage register is the polarity of the total.

Since the sum of eight binary numbers is equal to one-half of the average of the numbers, the number registered in the totalizing register upon completion of the addition process is equal to one-half of the average of the weight readings. To get the average, the total must be multiplied by two, and this is done simply by shifting the number in the totalizing register one place to the left, following which it will be in the form illustrated in FIG. 6. It will be noted that the resolution has increased from 1/64 ounce in the individual readings to 1/512 in the average.

The number registered in the totalizing register represents the average gross weight of the load during eight successive clock intervals. The average net weight can be determined by subtracting the average gross weight at a reference time, e.g., before the load is placed on the scale, from the current value of the average gross weight. In the preferred embodiment, this subtraction is effected by storing a number Z which is the complement of the average gross weight G at the reference time. This number is stored in section 2 of register 131, and its polarity is stored in the shift register. The average net weight is then determined by adding the numbers G and Z together, and the polarity of the net weight is stored in the shift register. As a result of the complementing process, the least significant bit of the number Z represents 1/1024 ounce.

Figure 7:
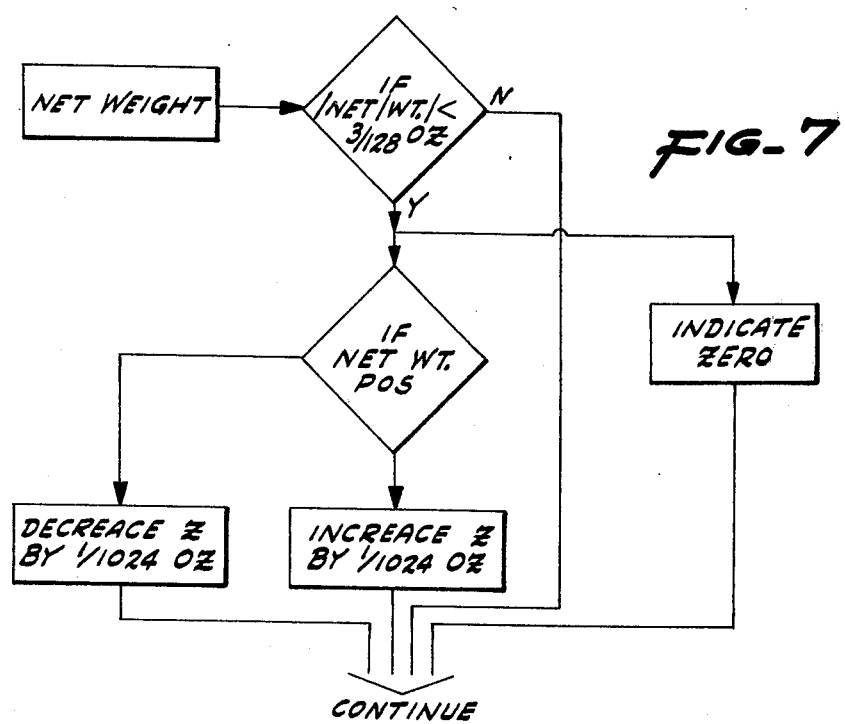
FIG. 7 is a flow chart illustrating the manner in which an accurate zero reference is maintained in the scale of FIG. 1.

As illustrated in FIG. 7, means is provided for increasing or decreasing the net weight reading in small increments during successive counting cycles to maintain an accurate zero reference. The net weight is checked during each counting cycle, and if it is within 3/128 ounce of zero, a light 136 adjacent to keyboard 26 is illuminated. If the absolute value of the net weight is greater than zero but less than 3/128 ounce, the net weight is made 1/1024 ounce closer to zero by incrementing or decrementing the number Z by that amount. If the net weight is positive, the number Z is increased by 1/1024 ounce, and if the net weight is negative, the number Z is decreased by this amount. The adjusting process continues in successive cycles until the net weight is exactly zero. If the absolute value of the net weight is greater than 3/128 ounce, it is assumed that there is a load on the scale, and no adjustment is made. If desired, a value other than 3/128 ounce can be utilized, but the value chosen sould be less than the expected weight of objects to be weighed on the scale. Likewise, a different value can be used for the increment by which the net weight is adjusted. However, this value is preferably substantially less than the range in which adjustments are made.

Figure 8:
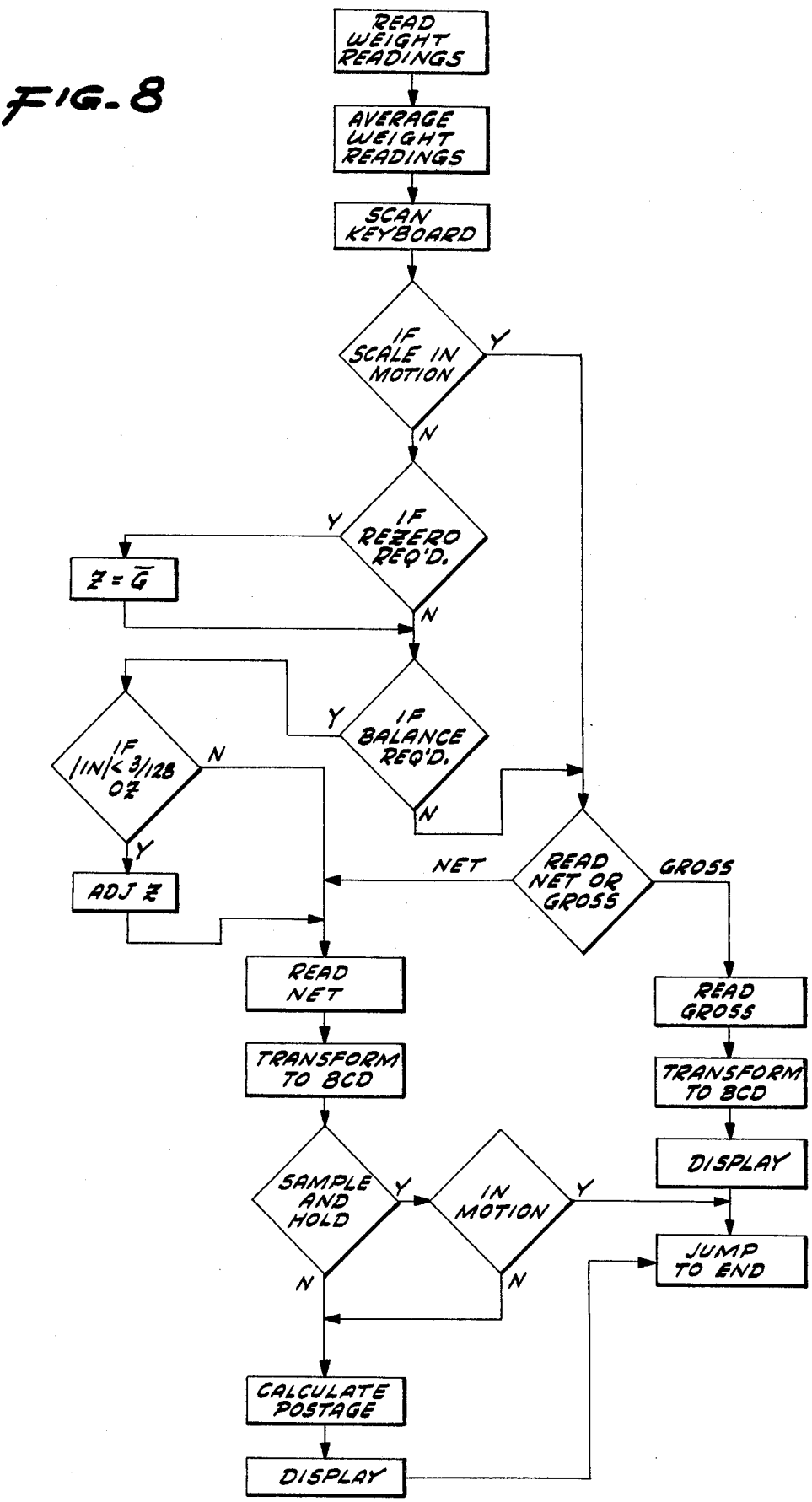
FIG. 8 is a flow chart illustrating the manner in which weight readings are made in the scale of FIG. 1.

The flow chart of FIG. 8 illustrates the manner in which weight readings are made. Instantaneous weight readings from converter 79 are read into the microprocessor where they are averaged in the manner described above. The keyboard is then scanned and the weight readings are checked to determine whether the scale is in motion. If the scale is not in motion, and rezero switch 124 is closed, the number Z is replaced by the complement of the number then in the totalizing register. The net weight is then checked for the zero reference level, and if necessary it is increased or decreased in the manner described above. If the scale is in motion, the rezeroing and net weight adjustment steps are bypassed. If gross weight switch 121 is closed, the gross weight reading is transformed from binary to binary coded decimal form and displayed. If the net weight switch is closed, the net weight is transformed to binary coded decimal form, and if sample and hold switch 123 is open, the postage is calculated. If the sample and hold switch is closed, the last instantaneous weight reading is compared with the average gross weight reading to determine whether the scale is in motion. If the scale is not in motion, the postage is determined, and if the scale is in motion, the postage determination is bypassed.

Figure 9:
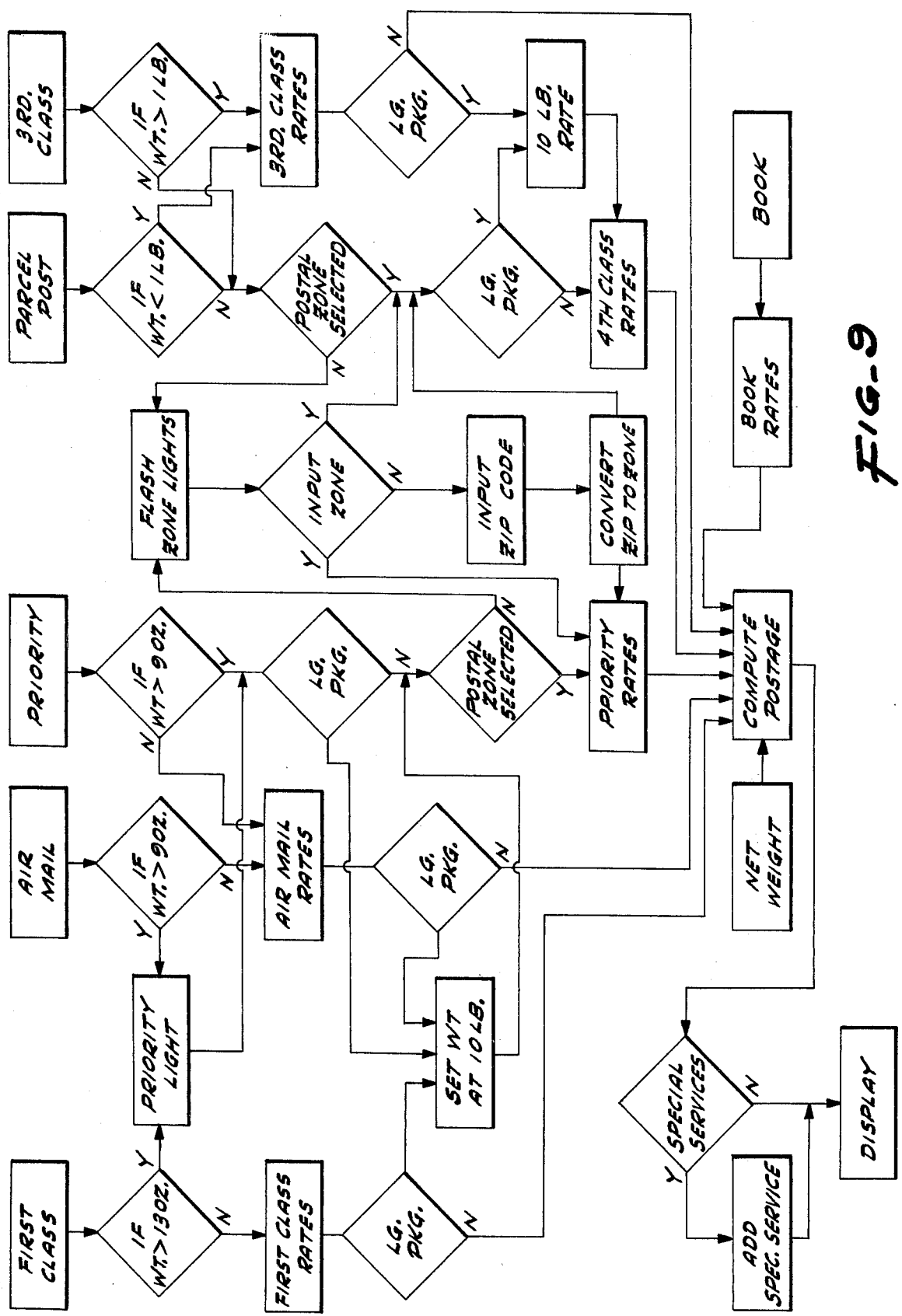
FIG. 9 is a flow chart illustrating the determination of postage in the scale of FIG. 1.

The flow chart of FIG. 9 illustrates the manner in which postage is determined in the preferred embodiment. Initially, the type of service is selected by the input to keyboard 26. If first class mail is selected, the weight of the letter or package is checked, and if it is greater than 12 ounces, the priority light is illuminated in place of the first class light, and the machine shifts to the priority mode. If the weight is not more than 12 ounces, the postage is computed on the basis of the first class rates.

When air mail is selected, the weight of the letter or package is checked, and if it is greater than 9 ounces, the machines shifts to the priority mode. If the weight is 9 ounces or less, the air mail rates are used in determining the postage.

When the priority mail key is depressed, the weight of the letter or package is again checked, and if it is 9 ounces or less, the scale shifts to the air mail mode. If the weight is greater than 9 ounces and no postal zone has been selected, the zone lights on the keyboard are flashed sequentially to indicate that a zone must be designated. The zone information can be input either by pressing the appropriate zone key or by entering the first three digits of the zip code of the destination into the zip code to postal zone converter by means of keyboard 27. If the converter is used, the zone is indicated by the light for the corresponding key on keyboard 26. If another zone is desired, the zone selected by the converter can be overridden with the key for the desired zone. When the zone is determined, the postage is computed on the basis of the priority mail rates.

When parcel post is selected, if the weight of the package is less than 1 pound, the scale switches to the third class mode. If the package weighs 1 pound or more, a check is made for postal zone data which is input in the manner described above. When the zone is determined, the postage is computed on the basis of the parcel post rates.

With third class mail, if the weight is more than one pound, the scale switches to the parcel post mail. Otherwise, the postage is determined on the basis of the third class rates.

With large, lightweight packages, the large package or minimum charge key is depressed, and if these packages weigh less than 10 pounds, they are shipped at the ten pound priority or parcel post rates, whichever is appropriate.

With books, postage is determined on the basis of the book rates.

Once the postage has been determined, the cost of any special services requested through the keyboard is computed and added to the postage, and the total cost of sending the package or letter is displayed.

Figure 10:
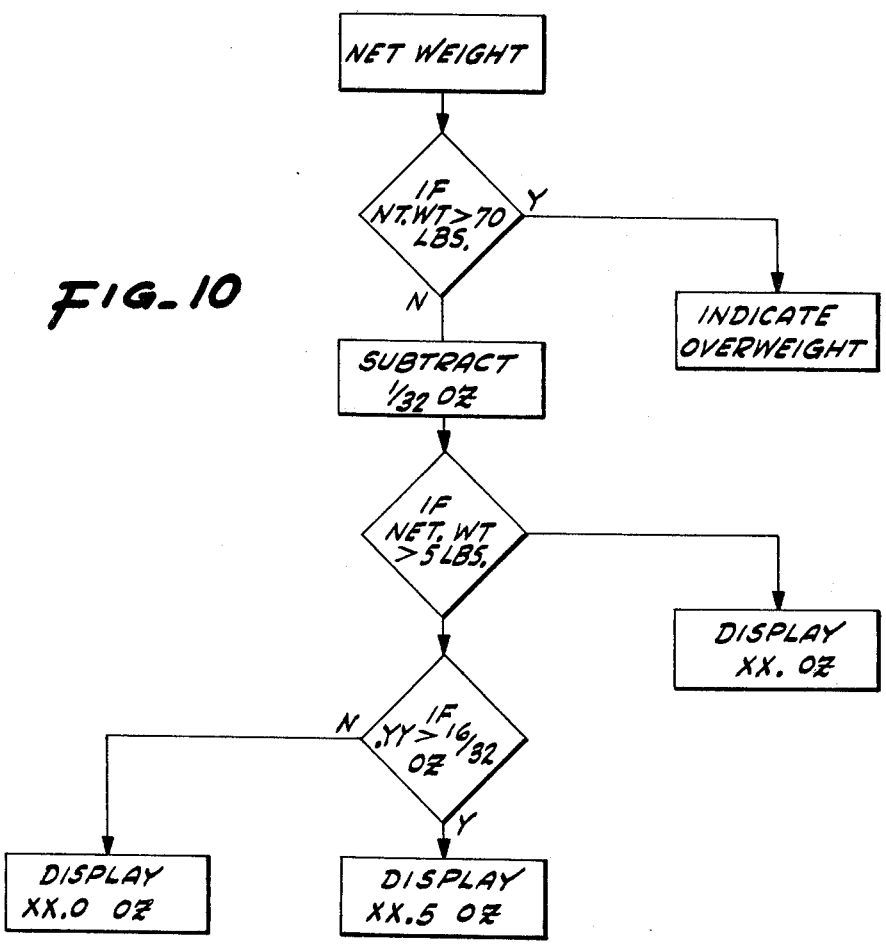
FIG. 10 is a flow chart illustrating the manner in which the net weight to be displayed is determined in the scale of FIG. 1.

The manner in which the weight of the package or letter is displayed is illustrated in FIG. 10. Initially, the net weight is checked, and if it is greater than the postal maximum (70 pounds), an overweight indication is given. In the preferred embodiment, this condition is indicated by a flashing of the postage display.

Throughout the scale, calculations are based on weight readings taken in 1/64 ounce increments, and this accuracy could be displayed in the weight readings, if desired. However, it has been found that larger increments are easier to read, and the postal service has suggested ½ ounce increments for weights between 0 and 5 pounds and 1 ounce increments for weights between 5 pounds and 70 pounds.

In the preferred embodiment, net weights less than five pounds are rounded off to the nearest half ounce for display purposes by subtracting 1/32 ounce from the weight. If the resulting fractional ounce is greater than 16/32 ounce, it is displayed as 0.5 ounce. If it is 15/32 ounce or less, it is displayed as 0.0 ounce. If the net weight is greater than 5 pounds, the weight is displayed to the nearest ounce. This special rounding off technique is required because the postal service treats weights up to 1/32 ounce over a limit as being within the limit in determining the applicable rate. For example, a letter weighing 1-1/32 ounce is sent at the 0–1 ounce rate. Subtracting 1/32 ounce from the true weight gives 31/32 ounce, and the rounded-off weight is displayed as 0.5 ounce.

The invention has a number of important features and advantages. The platform is mounted on and supported by the load cell, and there are no levers, pivots or other moving parts to wear out or require maintenance. The scale is highly accurate and easy to use, and it is suitable for use with other equipment such as postage memters and label/ticket printers.

It is apparent from the foregoing that a new and improved computing postal scale has been provided.

While only the preferred embodiment has been described, as will be apparent to those familar with the art, certain changes and modifications can be made without departing from the scope of the invention as defined by the following claims.

I claim:

1. In a computing postal scale: a base, at least one load cell mounted on the base and adapted to provide an electrical signal corresponding to the force applied thereto, load receiving means mounted on the load cell and supported thereby, said load receiving means having an area substantially larger than the load cell for receiving objects to be posted, means responsive to the signal from the load cell for providing digital signals representative of the weight of an object received by the load receiving means, means for storing postal rate information in digital form, and means for combining the rate information with the signals representative of weight to provide a signal representative of the cost of sending the object.

2. The scale defined by claim 1 wherein the load receiving means comprises a horizontally extending platform.

3. The scale defined by claim 1 further including means responsive to the signals representative of weight and cost for displaying the weight of the object and the cost of sending the same.

4. The scale of claim 1 further including a keyboard for receiving additional information and presenting the same to be combined with the rate information and the signal representative of weight in determining the cost of sending the object.

5. The scale of claim 1 wherein the signal provided by the means responsive to the signal from the load cell is in binary form.

6. In a computing scale: a load receiving member for receiving a load to be weighed, means including a load cell connected to the load receiving member for providing an electrical signal corresponding to the weight of the load, means responsive to the electrical signal for providing successive digital signals representative of the instantaneous weight of the load at a predetermined clock rate, means for storing a predetermined number of the instantaneous weight signals on a rotating basis whereby the oldest of the stored signals is replaced by the instantaneous weight signal provided during each successive clock period, means for determining the average of the stored signals to provide a continuously updated signal representative of the average instantaneous weight of the load, and means for storing postal rate information in digital form and means for combining the rate information with the signals representative of the average weight of the load to provide a signal representative of the cost of mailing the load.

7. The scale of claim 6 further including means responsive to the average net weight signal and the cost signal for displaying the net weight and the cost of mailing the load.

8. The scale of claim 6 further including a keyboard for receiving additional information and presenting the same to be combined with the postal rate information and the average instantaneous net weight signals in determining the cost of mailing the load.

9. In a method for determining the weight of an object, the steps of: providing an electrical signal corresponding to the weight of the object, converting the electrical signal to digital signals representative of the instantaneous weight of the load at a predetermined clock rate, storing a predetermined number of the instantaneous weight signals on a rotating basis whereby the oldest of the stored signals is replaced by the instantaneous weight signal provided during each successive clock period, determining the average of the stored signals to provide a continuously updated signal representative of the average instantaneous weight of the load, storing postal rate information in digital form and combining the rate information with the signals representative of the average weight of the object to provide a signal representative of the cost of mailing the object.

10. The method of claim 9 further including the steps of displaying the net weight and the cost of mailing the object.

* * * * *